US011279991B2

(12) United States Patent
Marshall

(10) Patent No.: US 11,279,991 B2
(45) Date of Patent: Mar. 22, 2022

(54) IRON TUNGSTEN BOROCARBIDE BODY FOR NUCLEAR SHIELDING APPLICATIONS

(71) Applicant: HYPERION MATERIALS & TECHNOLOGIES (Sweden) AB, Stockholm (SE)

(72) Inventor: Jessica Marshall, West Midlands (GB)

(73) Assignee: HYPERION MATERIALS & TECHNOLOGIES (Sweden) AB, Stockholm (SE)

( * ) Notice: Subject to any disclaimer, the term of this patent is extended or adjusted under 35 U.S.C. 154(b) by 120 days.

(21) Appl. No.: 16/610,995

(22) PCT Filed: Feb. 23, 2018

(86) PCT No.: PCT/EP2018/054585
§ 371 (c)(1),
(2) Date: Nov. 5, 2019

(87) PCT Pub. No.: WO2018/206173
PCT Pub. Date: Nov. 15, 2018

(65) Prior Publication Data
US 2020/0176142 A1 Jun. 4, 2020

(30) Foreign Application Priority Data
May 11, 2017 (EP) .................................... 17170735

(51) Int. Cl.
| C22C 27/04 | (2006.01) |
| B22F 3/10 | (2006.01) |
| C22C 1/05 | (2006.01) |
| C22C 29/06 | (2006.01) |
| C22C 29/14 | (2006.01) |

(Continued)

(52) U.S. Cl.
CPC ............ *C22C 27/04* (2013.01); *B22F 3/1039* (2013.01); *C22C 1/053* (2013.01); *C22C 1/058* (2013.01); *C22C 29/06* (2013.01); *C22C 29/062* (2013.01); *C22C 29/14* (2013.01); *C22C 30/00* (2013.01); *G21C 11/028* (2013.01); *G21F 1/06* (2013.01); *G21F 1/085* (2013.01); *B22F 2301/20* (2013.01); *B22F 2301/35* (2013.01); *B22F 2302/05* (2013.01); *B22F 2302/10* (2013.01);
(Continued)

(58) Field of Classification Search
None
See application file for complete search history.

(56) References Cited

U.S. PATENT DOCUMENTS 3,988,118 A 10/1976 Grierson et al.

FOREIGN PATENT DOCUMENTS

| CN | 101031664 A1 | 9/2007 |
| CN | 101353771 | 1/2009 |

(Continued)

OTHER PUBLICATIONS

Turan Gurgenc et al, "Microstructural and Wear Properties of FE—CR—W—B—C Composite Coating Performed with PTO Method", E-Journal of New World Sciences Academy, vol. 11(4): pp. 171-184, Oct. 24, 2016.

Primary Examiner — Anthony J Zimmer
Assistant Examiner — Dean Mazzola

(57) ABSTRACT

Provided is a body, a method for manufacturing the body and a method of using of the body for nuclear shielding in a nuclear reactor. The body may include boron, iron, chromium, carbon and tungsten.

16 Claims, 2 Drawing Sheets

(51) Int. Cl.
*C22C 30/00* (2006.01)
*G21C 11/02* (2006.01)
*G21F 1/06* (2006.01)
*G21F 1/08* (2006.01)

(52) U.S. Cl.
CPC ....... *B22F 2998/10* (2013.01); *B22F 2999/00* (2013.01)

(56) References Cited

FOREIGN PATENT DOCUMENTS

| | | | |
|---|---|---|---|
| CN | 101353771 A | * | 1/2009 |
| CN | 103695680 A1 | | 4/2014 |
| CN | 105803267 | | 7/2016 |
| EP | 0484014 A1 | | 5/1992 |
| GB | 2109409 | | 6/1983 |
| RU | 2138575 C1 | | 9/1999 |
| RU | 2532776 C1 | | 11/2014 |
| WO | 2012023265 | | 2/2012 |

* cited by examiner

IRON TUNGSTEN BOROCARBIDE BODY FOR NUCLEAR SHIELDING APPLICATIONS This is a National Phase Application filed under 35 U.S.C. 371 as the national stage of PCT/EP2018/054585, filed on Feb. 23, 2018, an application claiming the benefit of European Patent Application No. 17170735.9, filed on May 11, 2017, the entire content of each of which is hereby incorporated by reference in its entirety.

TECHNICAL FIELD

The present disclosure relates to a body, a method for manufacturing the body and the use of the body for nuclear shielding in a nuclear reactor.

BACKGROUND

The rate of energy consumption per person is greater than the current generating capacity therefore this has led to new interest in the possibilities of nuclear power as a carbon neutral power source which could potentially solve the energy gap. In particular, recent advances in magnet technology make the possibility of controlled fusion as a feasible carbon-negative power source a real alternative in the near future. Larger reactors, such as the International Thermonuclear Experimental Reactor (ITER) and Joint European Torus (JET) plan to use tungsten metal with beryllium for the plasma facing components. There is however an issue with using tungsten metal in this application tungsten metal it is difficult to manufacture in bulk, and furthermore, both tungsten and beryllium can form hazardous oxides at high temperatures. Therefore, there is a drive to find lower cost, safer alternatives.

When designing any type of nuclear reactor it is important to consider how the reactor components should be protected from the high neutron flux and the gamma rays generated by the nuclear reactor. In terms of radiation shielding, there is a need to be an efficient biological shield and also a need to be able to shield other parts of the reactor, such as the electronic systems. The shielding material must be able to provide protection against a wide range of highly energetic radioactive species including α, β and γ-rays neutrons over a short distance. These conditions place strict limits on the type of materials which can be used. It is also important that the shielding itself is resistant to activation and does not activate into harmful radioisotopes when irradiated. This means that materials containing significant quantities of Ni and Co cannot be used since these are activation hazards when irradiated.

Both small modular fission reactors and magnetic confinement reactors are proposed as part of the next generation of nuclear power plants. Small modular nuclear plants have the potential to be safer and more efficient than the large nuclear power plants currently in use. In the case of magnetic confinement fusion reactors, they are reliant on cryogenically cooled copper and/or High Temperature Superconductors (HTS) to generate a magnetic field, therefore the space between the plasma chamber and the cold conductors (copper/HTS) is limited. In both cases, these types of reactor pose an additional challenge when considering the choice of material for radiation shielding since the geometry of such reactors means that space is limited and therefore the shielding material must be able to be applied in thin layers and still maintain the shielding efficiency.

Therefore, the challenge is to find an alternative shielding material that does not need to be applied in excessively large thicknesses to achieve a good shielding; the material should also not form any hazardous by-products from the exposure to the nuclear fusion process. It is imperative that the material must not contain elements which would transmute to harmful radionuclides, such that it would impede decommissioning and refuelling of such a device at the end of a duty cycle. Critically, it must be possible to manufacture the material to be used for this application using conventional techniques. The most suitable materials for this application would also have good oxidation resistance and good thermal conductivity.

SUMMARY

Thus, the present disclosure therefore provides a body comprising the following elements in atomic percent (at %): boron (B) 21-41; iron (Fe) 25-35; chromium (Cr) 2-4; carbon (C) 3-10; and remainder tungsten (W). The present disclosure will provide a material with optimal properties for nuclear shielding, which is sinterable, has the highest possible density and lowest possible porosity.

The inventors have surprisingly found that the compositional ranges as disclosed herein will produce a body having the most optimal material properties for nuclear shielding. Hence, the balance between boron and tungsten has been selected so that the body to be used for nuclear shielding has the optimum absorption properties.

The present disclosure also relates to a method of producing a body comprising the steps of:
 a. providing one or more powders comprising the elements B, Fe, Cr, C and W;
 b. milling the one or more powders with an organic binder to obtain a powder mixture;
 c. pressing the milled powder mixture; and
 d. sintering the pressed powder mixture to obtain a sintered body;
characterised in that the one or more powders comprises the following elements in atomic percent: Boron 21-41; Iron 25-35; Chromium 2-4; Carbon 3-10; and remainder tungsten.

Additionally the present disclosure also relates to the use of a body for manufacturing an object for nuclear shielding in a nuclear reactor.

DETAILED DESCRIPTION

Figure 1:
FIG. 1: discloses an optical microscopy image of the microstructure of sample A.

Hence, one aspect of the present disclosure relates to a body comprising the following elements in atomic percent (at %): boron (B) 21-41; iron (Fe) 25-35; chromium (Cr) 2-4; carbon (C) 3-10; and remainder tungsten (W).

This composition has been found to form the most stable microstructures in terms of good sinterability, good mechanical properties, the ability to avoid fracturing and the occurrence of pull-outs during the processing step of polishing and keeping the level of porosity to a minimum.

The 'atomic percent (at %)' of the elements is calculated accordingly:
a. Calculating the 'atomic breakdown percentages' for each powder added using the molecular weights of the elements in that powder, e.g. for $B_4C$ the relative boron content is calculated in the following way: (4×molecular weight B (10.81))/((molecular weight carbon (12.01)+(4×molecular weight boron (10.81)))×100=78.2 wt % B. The 'atomic breakdown percentage' for the C in $B_4C$ is then 21.8 wt %.
b. Calculating the 'atomic breakdown in grams' by multiplying the 'atomic breakdown percentage' by the weight of that powder added (in grams). This step will convert the amount into the weight of atoms present for each element in the composition.
c. Calculating the 'molar quantity' by taking the 'atomic breakdown in grams' and dividing it by the molar mass of the element. From this the number of moles of atoms for each element in the composition is determined.
d. Calculating the 'atomic percent (at %)' by taking the 'molar quantity' for each element and dividing it by the sum of all the 'molar quantities' to normalize the mole fraction of each atomic species into a percentage.

The compositional ranges as described hereinbefore and hereinafter will provide a body with a high density, low porosity and high thermal conductivity. This combination of material properties provides the highest possible nuclear shielding capability. A high density means that there is the highest possible number of atoms available to absorb neutrons and electromagnetic radiation. The presence of any pores in the material would have a detrimental impact on the ability of the body to absorb radiation and heat. Hence, therefore it is desirable to have the lowest possible porosity. It is also beneficial to obtain a body with a high thermal conductivity to reduce the power needed to remove the build-up of unwanted heat.

According to one embodiment, the present body has a Fe content of from 25-35 at %, such as 28 to 32 at %, such as 29 to 31 at %. This composition has been found to form the most stable microstructures in terms of good sinterability, good mechanical properties, the ability to avoid fracturing and the occurrence of pull-outs during the processing step of polishing and keeping the level of porosity to a minimum.

Boron (B) will absorb the energy of the neutrons thus making them easier to shield. The content of B in the present body is of from 21-41 at %. For optimal shielding capability, the B content should be as high as possible for slowing neutrons. If the B content is too low, then the obtained body will not have good shielding capability. On the other hand, if the B content is too high, the obtained body will be too brittle and there would also have insufficient W content to provide a shield against the more energetic species, such as the γ-rays.

Chromium will act as a carbon sink and it will also supress the magnetism of Fe and will aid with corrosion resistance. The corrosion resistance is important as it will reduce the risk of oxidation during the manufacturing of the body.

Carbon (C) is as a grain refiner. If the C content is too low, undesirable brittle phases, such FeB may form and if the C content is too high, there is a higher tendency for pores and brittle carbon rich phases to form in the body, which would have a detrimental effect on the shielding efficiency of the material.

The tungsten (W) constitute the remainder of the body will provide a good shield against the neutrons and further a tungsten rich environment is beneficial to densification. If W is added primarily in the form of WC, the W then is consumed by C and Fe(Cr). This means that free C is left if there is insufficient amount of W. If there is free W the obtained body will have a low density and porous microstructure. Therefore, W is added primarily in the form of W metal. It may however, be beneficial to add small amounts of W in the form of WC, such as no more than 5 wt % WC, calculated as a portion of the total composition, in order to counter variations in composition resulting from WC milling media pick up or from the Polyethylene glycol (PEG) which is used as the organic binder and acts as a pressing aid. WC also can act as the nucleation seed for $WC/WB_2$ growth to absorb carbon from $B_4C$.

In this present disclosure, a body with good sinterability would have three dimensional shrinkage, such as of from 15-22% and the body will have a dense sintered structure from a pressed powder sample post sintering.

In one embodiment, in the body as defined hereinabove or hereinafter, at least 95 at % of the Fe is in the form of a boride, an intermetallic boride or an intermetallic carbide.

In one embodiment, in the body as defined hereinabove or hereinafter, at least 95 at % of the Cr is in the form of a boride, an intermetallic boride or an intermetallic carbide.

In one embodiment, in the body as defined hereinabove or hereinafter, less than 5 at % of Fe is the form of FeCr.

It has been observed that when a cemented carbide material is bombarded with neutrons, "bubbles" will form at the 'hard phase-metallic binder phase' boundaries. These "bubbles" may then accumulate and become a pore; the presence of pores is not desirable in a nuclear shielding material as their presence decreases the shielding efficiency of the material. Therefore, it may be advantageous to have a material which does not contain a metallic binder phase. In contrast to a cemented carbide, in the case of the present disclosure, during sintering all $B_4C$ and W will react with the FeCr and therefore a body is produced which is free of a metallic binder phase. Therefore the body of the present disclosure is not a cemented carbide. Typically for a cemented carbide when Fe and Cr containing powders are added, the composition is provided stoichiometrically balanced in terms of carbon, the majority of the Fe and Cr would form an FeCr metallic binder phase post sintering, such as at least 95 at % of Fe and at least 95 at % of Cr would be present in the form of FeCr metallic binder phase and there would be only trace amounts of Fe and Cr present as an intermetallic carbide. Instead, for the body of the present disclosure, the majority, such at least 95 at % of the Fe and at least 95 at % of the Cr are present in the form of a boride, such as FeB or $Fe_2B$, or an intermetallic boride, such as $B_8Fe_5W_7$, or an intermetallic carbide. Furthermore, there is no or only trace amounts of FeCr metallic binder phase formed, such as less than 5 at %, hence the body of the present disclosure may be considered to have no metallic binder phase.

Another aspect of the present disclosure relates to a method of producing a body comprising the steps of:
a. providing one or more powders comprising the elements B, Fe, Cr, C and W;
b. milling the one or more powders with an organic binder to obtain a powder mixture;
c. pressing the milled powder mixture; and
d. sintering the pressed powder mixture to obtain a sintered body;

characterised in that the one or more powders comprises the following elements in atomic percent:
Boron 21-41;
Iron 25-35;

Chromium 2-4;
Carbon 3-10;
and remainder tungsten.

The one or more powders are milled together with an organic binder typically by using a ball mill. The organic binder is added to aid the pressing and is typically a poly(ethylene glycol) (PEG), such as PEG 34. Typically, then the powder formed into shape by using a pressing method, for example using a TOX press. Then after pressing, the powder mixture is sintered, for example using a Sinter HIP furnace. However, other milling, forming and sintering methods could be employed and other pressing aids used for the method of the present disclosure as described herein.

It should also be appreciated, that it may be useful to also add a pre-sintering step before the sintering step.

In the present disclosure the term "powder", refers to fine, dry particles of a solid substance.

In one embodiment, the sintering method as defined hereinabove or hereinafter is a reactive sintering process. In the present disclosure the term "reactive sintering" means that chemical reactions occur in situ during the sintering process so that the combination of phases present in the sintered body is different compared to the combination of elements and/or compounds is provided in their powder form. This is different to conventional liquid stage sintering that is typically used for the production of a cemented carbide or a cermet, because in conventional liquid stage sintering, the combination of phases present in the sintered material are the same as the original combination of elements and compounds added in their powder form. Conventional liquid phase sintered carbides have some solid-state densification reactions below the liquid phase point but the bulk of densification occurs in the liquid phase temperature range rather than during the solid state interactions period, which is not the case for the body of material disclosed in the present disclosure.

For the present disclosure, the sintering process, may be performed at temperatures between 1450° C.-1520° C., and in a vacuum or SinterHIPing (typically at ~50 bar) in an argon atmosphere. The reaction occurs within the powder mixture upon heating. During the sintering cycle, firstly the organic binder is removed. Then initial reactions occur in solid state typically at around 550° C. Further reactions start occurring at around 800° C. forming metastable phases with more stable phases forming at 1000° C. and above. During the sintering process the WC and $B_4C$ present are consumed and a variety of mixed phases, including FeB, WB and $WB_2$ are formed. Other more complex $Fe_xW_yB_z$ phases may also be present. Good shrinkage and dimensional control is possible using the reactive sintering process, as this process has similar mass loss and three dimensional shrinkage as conventional liquid phase sintering of tungsten carbide based cemented carbides. The reactive sintering process results in a body which is void of any metallic binder forming post sintering. Importantly, the bodies may be manufactured using standard industrial sintering equipment and processes.

In one embodiment, the boron is added in the form of a $B_4C$ powder. The amount added is of from 4 wt % to 9 wt % based on the total amount of the one or more powders added. If the amount of $B_4C$ is less than 4 wt % then a useful boron rich shielding material will not be achieved, since the resulting material will be sintered poorly, suffer considerable delamination and will be very brittle. If the amount of $B_4C$ added is greater than 9 wt % there are issues with sinterability as there is an increased risk of porosity due to the possibility of insufficient W metal being available to react with boron. It is important to keep the porosity as low as possible as porosity will affect the shielding efficiency. The boron could alternatively be added in an equivalent amount of FeB, WB, elemental B or CrB.

In the present disclosure the term "weight percent" (wt %), refers to the relative weights of the one or more powders weighed in comparison to the total amount of powder provided.

In one embodiment, the method as defined hereinabove or hereinafter, iron and chromium are added in the form of an FeCr powder, in an amount 17-26 wt %. The amount of FeCr added is selected to obtain the optimum atomic weight of Fe in the body. According to one embodiment, the Cr content of FeCr powder added is of from 2 to 20 wt %, such as 2 to 8 wt % of the total amount of FeCr. In other words, if the quantity of FeCr added to the composition is 20 wt % then 0.4-4 wt % of this is the Cr and the balance is the Fe. FeCr is typically added in its pre-alloyed form as this reduces the oxidization and corrosion risk from the Fe present. Cr may also be added in the form of $Cr_3C_2$ or Cr metal. If FeCr consists of less than 2 wt % Cr there is an increased risk of oxidization during processing and the sintered body will have a reduced corrosion resistance. However, if the amount FeCr consists of more than 20 wt % Cr, the concentration of the Cr would be too high and this would cause a net reduction in the amount of B incorporated, thus reducing the shielding efficiency of the body. Fe8Cr (meaning that the FeCr had 8 wt % Cr content) is the most common composition of FeCr used for manufacture of the W—B—FeCr materials.

According to one embodiment, the method as defined hereinabove or hereinafter, W is added in the form of W and optionally WC, such as optionally <5 wt % WC.

Within the compositional ranges disclosed hereinbefore or hereinafter, it may be that specific compositions are selected for the most optimal body properties for use in a specific type of nuclear reactor or for a specific part of the nuclear reactor. For example, a more a W-rich composition may be selected if the primary purpose of the body is to shield against a flux which has a significant gamma ray and fast neutron contingent. On the other hand, a more boron rich composition may be selected if the primary purpose of the body is to shield against a flux where slow neutrons are the most prevalent contingent.

The following examples are illustrative, non-limiting examples.

EXAMPLES

As can be seen from the experiments, materials where W metal is used as the main component rather than WC have shown a much more promising result.

The materials used in the example were prepared using standard laboratory powder metallurgy methods. In all of the examples FeCr was in the form of Fe8Cr (meaning that the FeCr had 8 wt % Cr content) and the boron source was in the form of $B_4C$, which had a target grain size of 8 µm. The powders were weighed in accordance with the quantities shown in table 1 and milled with a PEG3400 organic binder and tungsten carbide media in a ratio of 9:1 powder:milling media in ethanol and water for 2 hours. The powder was then dried, sieved and pressed with a target pressure of 100 MPa either with a TOX press or a split die. The pressed samples were then sintered at a temperature between 1450° C. and 1520° C. for 1 hour using a vacuum (DMK) cycle at 50 bar. The higher sintering temperatures were used for some of the higher boron containing samples to improve the crystal quality and mechanical properties, details are given in table 1 below. Cross sections of the samples were polished using wet grinding and sequential fine diamond polishing with colloidal silica as the final stage polish. Samples were then examined by optical and scanning electron microscopy (SEM). Table 1 below shows a summary of examples tested, including the weight percentages of the powders samples tested and the composition of the sintered samples in atomic percent and Table 2 shows the properties of each example material post sintering.

In many of the examples, the density compared to theoretical density is greater than 100%, this is hypothesized to be because there is a loss of carbon during the sintering process.

Samples A, B and C show comparative compositions which fall outside of the compositional ranges of the present disclosure and have poorer structures post sintering. Samples D, E and F show examples of compositions which fall within the scope of the invention and have the most optimised sintered structures.

An optical microscopy image of sample A is shown in FIG. 1. Sample A has too much Fe, too little B and too little

TABLE 1

| Sample | Raw material powder weigh in (wt %) | | | | Composition in atomic percent (at %) | | | | | Comments on sintered sample |
|---|---|---|---|---|---|---|---|---|---|---|
| | WC | Fe8Cr | $B_4C$ | W | W | C | Fe | Cr | B | |
| A | 1 | 20 | 3 | 76 | 39.66 | 4.62 | 31.40 | 2.73 | 20.58 | Brittle structure with delamination, fracturing on polishing. |
| B | 1 | 30 | 8 | 61 | 21.1 | 9.04 | 31.03 | 2.73 | 36.2 | Large voids, brittle fracturing leading to pitting on surface. |
| C | 1 | 15 | 6 | 78 | 34.4 | 9.11 | 19.92 | 1.73 | 34.8 | Highly porous and presence of voids. |
| D (invention) | 1 | 23 | 7 | 69 | 26.5 | 6.01 | 26.6 | 2.2 | 35.4 | Fewer pores |
| E (invention) | 1 | 25 | 9 | 65 | 22.1 | 7.29 | 25.5 | 2.2 | 40.1 | Only small voids |
| F (invention) | 1 | 21.5 | 5.5 | 72 | 30.3 | 4.89 | 28.8 | 2.5 | 30.8 | Only minimal voids |

TABLE 2

| Sample | Density (g cm$^{-3}$) | Density compared to theoretical density (%) | HV30 (kgf mm-2) | K1c (MPa m$^{0.5}$) (palmquist) | Comments |
|---|---|---|---|---|---|
| A | 13.20 | 102.0 | 780 | 5.0 | Brittle structure with delamination, fracturing on polishing |
| B | 10.30 | 105.1 | 1015 | 6.5 | Large voids, brittle fracturing leading to pitting on surface. |
| C | 11.37 | 95.3 | 801 | 7.3 | Highly porous and presence of voids. |
| D (invention) | 10.81 | 101 | 1319 | 6.3 | Fewer pores |
| E (invention) | 10.37 | 105.5 | 1072 | 6.3 | Only small voids |
| F (invention) | 12.62 | 110.3 | 1505 | 8.4 | Only minimal voids |

The properties in Table 2 have been measured according ISO 3369:1975 for the density and ISO 3878:1983 for the hardness. 'Density compared to theoretical density (%)' is defined as being the measured density divided by the theoretical density×100. In the present disclosure, it is an approximated theoretical density that is being measured as for the boride-based compounds disclosed herein, there is a considerable amount of phase transformation which takes places during the reactive sintering. The theoretical density is defined as being the weighted average density of the reagents prior to sintering.

C. The sample is brittle; it is also poorly sintered and fractured easily upon polishing. Long, thin features (2) in the microstructure are indicative of poor debinding.

Figure 2:
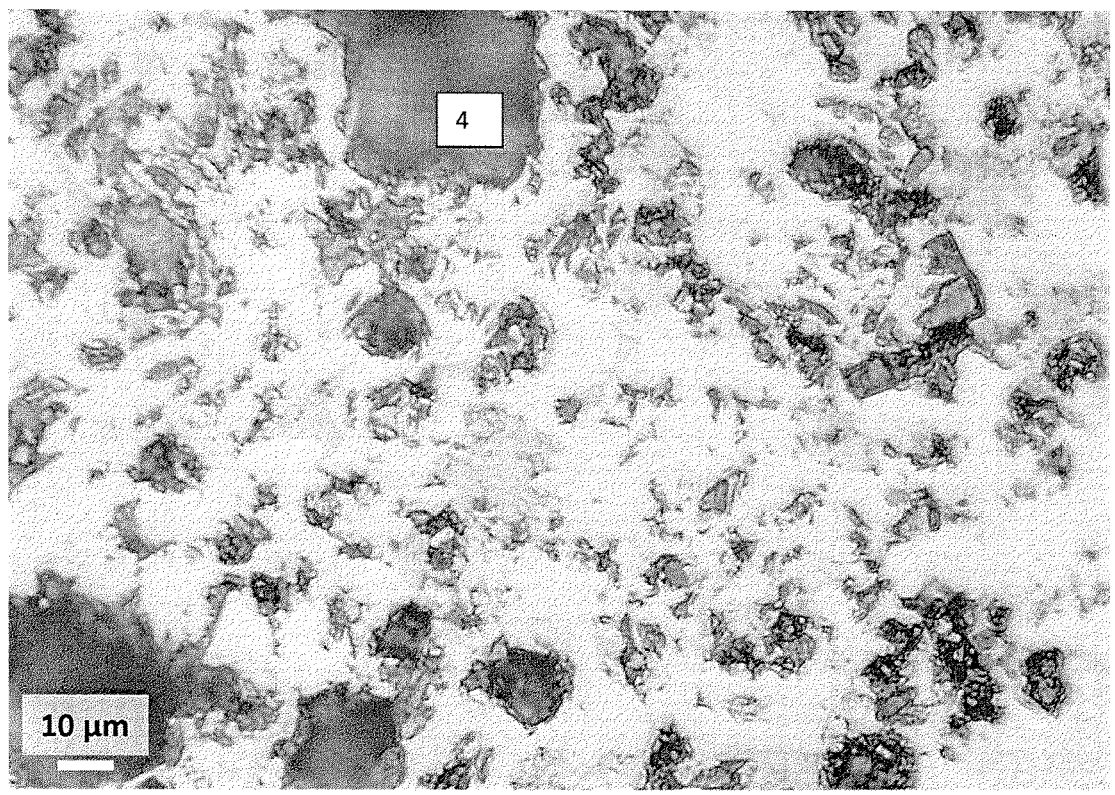
FIG. 2: discloses an optical microscopy image of the microstructure of sample B.

An optical microscopy image of sample B is shown in FIG. 2. Sample B has too much Fe and too little W. There are voids present in the microstructure (4) and there is significant brittle fracture.

Figure 3:
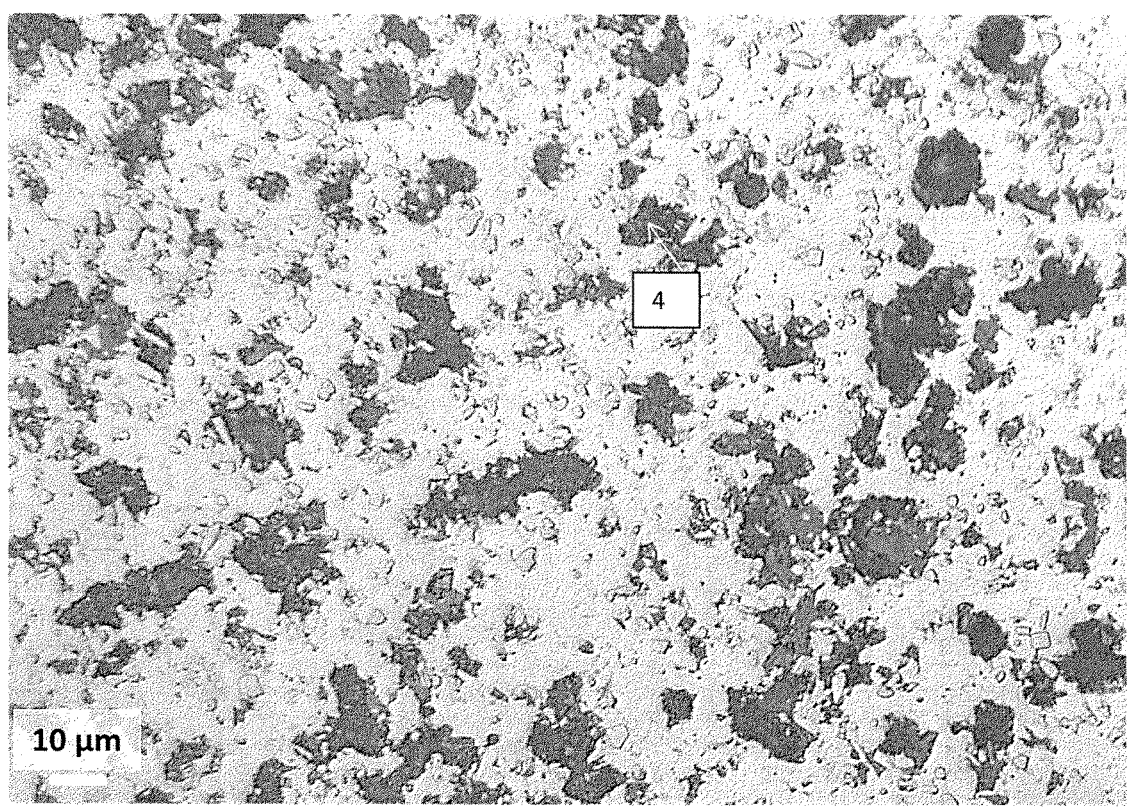
FIG. 3: discloses an optical microscopy image of the microstructure of sample C.

An optical microscopy image of sample C is shown in FIG. 3. Sample C has too little Fe. This sample is very porous and there are voids present (4) in the microstructure.

Figure 4:
FIG. 4: discloses an optical microscopy image of the microstructure of sample F.

Sample D, E and F fall inside the compositional ranges of the present disclosure. These samples generally have a 'higher density/theoretical density', fewer pores and voids and are less prone to fracturing. An example microstructure of a sample falling within the scope of the present disclosure is shown in FIG. 4.

The structure and properties of the body of the present disclosure are more similar to a ceramic than a cemented carbide. Electron backscatter diffraction (EBSD) analysis, shows evidence that the structure of the present body is dominated by regions of iron tungsten boride separated by iron boride, with traces of other phases such as WB and WC, but no metallic binder phase. Therefore, for the body of the present disclosure, there are no 'hard phase-metallic binder phase' boundaries present where for "bubbling" could occur.

The results of the phases detected from (EBSD) analysis completed on samples E and F, using a Zeiss Supra 55VP FEGSEM, are shown in table 3. 'Trace' refers to <2% abundance, 'significant' refers to 2-15% abundance, 'abundant' refers to >15% abundance, 'dominant' refers to >25% abundance. Within the accuracy of the EBSD technique for being able to quantify the abundancies of the different phrases the analysis showed that there was no detectable presence of FeCr present i.e. <5 at %. The presence of the Fe was detected to be in the forms of $Fe_2B$, FeB and $B_8Fe_5W_7$ i.e. >95 at % of the Fe is present in the form of a boride, an intermetallic boride or an intermetallic carbide.

TABLE 3

| Phases | Sample E | Sample F |
|---|---|---|
| WC | 0.00 | 0.00 |
| $M_6C/W_2C/M_7C_3$ | 0.00 | Trace |
| FeCr | 0.00 | 0.00 |
| $WB^2$ | Trace | Significant |
| $WB_2$ | 0.00 | 0.00 |
| $W_2B$ | Trace | 0.00 |
| $Fe_2B$ | Significant | Trace |
| FeB | Significant | Dominant |
| $B_8Fe_5W_7^1$ | Dominant | Significant |

The invention claimed is:

1. A body composition, comprising:
   boron in an amount of 21-41 atomic percent (at %);
   iron in an amount of 25-35 at %;
   chromium in an amount of 2-4 at %;
   carbon in an amount of 3-10 at %; and
   a balance of tungsten of the body composition,
   wherein at least 95 at % of the Fe is in the form of a boride, an intermetallic boride or an intermetallic carbide.

2. The body composition according to claim 1, wherein at least 95 at % of the Cr is in the form of a boride, an intermetallic boride or an intermetallic carbide.

3. The body composition according to claim 1, wherein less than 5 at % of the Fe is in the form of FeCr.

4. A method of producing a body composition, comprising:
   providing one or ore powders comprising B, Fe, Cr, C and W;
   milling the one or more powders with an organic binder to obtain a powder mixture;
   pressing the milled powder mixture; and
   sintering the pressed powder mixture to obtain a sintered body,
   wherein the one or more powders comprising the B, the Fe, the Cr, the C and the W include
      boron in an amount of 21-41 atomic percent (at %);
      iron in an amount of 25-35 at %;
      chromium in an amount of 2-4 at %;
      carbon in an amount of 3-10 at %; and
      a balance of tungsten of the body composition,
   wherein at least 95 at % of the Fe is in the form of a boride, an intermetallic boride or an intermetallic carbide.

5. The method according to claim 4, wherein the sintering step is a reactive sintering process.

6. The method according to claim 4, wherein the boron is added in the form of $B_4C$.

7. The method according to claim 4, wherein the iron and the chromium are added in the form of FeCr.

8. The method according to claim 4, wherein the W is added in the form of W and optionally WC.

9. The method according to claim 8, wherein the amount of the WC added is less than 5 wt %.

10. A method of manufacturing an object for nuclear shielding in a nuclear reactor, comprising:
    preparing a body composition comprising
      boron in an amount of 21-41 atomic percent (at %);
      iron in an amount of 25-35 at %;
      chromium in an amount of 2-4 at %;
      carbon in an amount of 3-10 at %; and
      a balance of tungsten of the body composition,
    wherein at least 95 at % of the Fe is in the form of a boride, an intermetallic boride or an intermetallic carbide.

11. A body composition, comprising:
    boron in an amount of 21-41 atomic percent (at %);
    iron in an amount of 25-35 at %;
    chromium in an amount of 2-4 at %;
    carbon in an amount of 3-10 at %; and
    a balance of tungsten of the body composition,
    wherein at least 95 at % of the Cr is in the form of a boride, an intermetallic boride or an intermetallic carbide.

12. The body composition according to claim 11, wherein at least 95 at % of the Fe is in the form of a boride, an intermetallic boride or an intermetallic carbide.

13. The body composition according to claim 11, wherein less than 5 at % of the Fe is in the form of FeCr.

14. A body composition, comprising:
    boron in an amount of 21-41 atomic percent (at %);
    iron in an amount of 25-35 at %;
    chromium in an amount of 2-4 at %;
    carbon in an amount of 3-10 at %; and
    a balance of tungsten of the body composition,
    wherein less than 5 at % of the Fe is in the form of FeCr.

15. The body composition according to claim 14, wherein at least 95 at % of the Fe is in the form of a boride, an intermetallic boride or an intermetallic carbide.

16. The body composition according to claim 14, wherein at least 95 at % of the Cr is in the form of a boride, an intermetallic boride or an intermetallic carbide.

* * * * *